United States Patent Office 3,740,377
Patented June 19, 1973

3,740,377
ONE-STEP PREPARATION OF A POLYURETHANE-UREA RESIN USING A TETRAALKYLGUANIDINE OR ISOCYANATE ADDUCT THEREOF AS A CATALYST
George W. Huffman, Crystal Lake, and Norman E. Rustad, Barrington, Ill., assignors to The Quaker Oats Company, Chicago, Ill.
No Drawing. Continuation-in-part of application Ser. No. 159,498, July 2, 1971. This application Feb. 11, 1972, Ser. No. 225,652
Int. Cl. C08g 22/36
U.S. Cl. 260—75 NC           14 Claims

ABSTRACT OF THE DISCLOSURE

This invention relates to a one-step process for the curing of mixtures of polyisocyanates, polyols, and certain aromatic diamines to form polyurethane-urea resins useful for films and coatings or for other standard urethane applications, and has particular relation to a catalyst for the one-step curing of said mixtures.

CROSS-REFERENCES TO RELATED APPLICATIONS

This application is a continuation-in-part of application Ser. No. 159,498, filed July 2, 1971 and now abandoned.

BACKGROUND OF THE INVENTION

Field of the invention

This invention concerns a novel one-step process for preparing polyurethane-urea resins. More particularly, this invention is concerned with a one-step process for the preparation of polyurethane-urea elastomers.

Description of the prior art

The process of preparing polyurethane-urea resins by first forming a pre-polymer by the reaction of a polyisocyanate with a polyol and then reacting the prepolymer with a diamine extender is well known. From an economical standpoint a one-step process for the manufacture of polyurethane-urea resins is highly desirable. Although a one-step process has been sought, no satisfactory process has been available up until now.

The seemingly insurmountable problem to be overcome in a one-step process is to bring the hydroxyl-isocyanate reaction rate of the polyol into kinetic balance with the faster amine-isocyanate reaction. In the absence of a kinetically equalizing catalyst, the isocyanate preferentially reacts with the diamine to form a polyurea which is often incompatible with the unreacted polyol. The polyurea generally separates from the unreacted polyol to give the resulting polymeric product a hazy appearance. In some instances, the polyurea may completely separate from the unreacted polyol by precipitating as a gel.

Certain metallic organic catalysts have been used to provide a kinetic balance between the amine-isocyanate and hydroxyl-isocyanate reaction rates. Calcium naphthenate, dibutyltin dilaurate, stannous octoate, cobalt naphthenate, and lead octoate for example have been tried. None has been completely satisfactory in equalizing the above competing reaction rates as evidenced by the hazy, streaked, bubbled or otherwise defective polyurethane-urea reaction products. The defective products are probably caused in part by the above-mentioned separation of the preferentially formed polyurea from the unreacted polyol.

In view of the above there currently exists a need for a catalyst which will equalize the amine-isocyanate and hydroxyl-isocyanate reaction rates to provide a polyurethane-urea resin which is substantially free of haze, streaks, and bubbles.

We have unexpectedly found that a tetraalkyl derivative of guanidine or an isocyanate adduct thereof is effective as a catalyst for bringing into kinetic balance the amine-isocyanate and hydroxyl-isocyanate reaction rates with certain aromatic diamines.

Heretofore tetraalkyl derivatives of guanidine and/or the isocyanate adducts thereof have been used as catalysts in the preparation of polyurethane foams and polyepoxides. Never before has their remarkable potential as a catalyst in a one-step preparation of polyurethane-urea resins been realized.

SUMMARY OF THE INVENTION

It is an object of this invention to provide a one-step process for the preparation of certain polyurethane-urea resins, and more particularly for the preparation of certain polyurethane-urea elastomers.

Another object of this invention is to provide a one-step process for the preparation of certain polyurethane-urea resins which are substantially free of haze, streaks, and bubbles.

Still another object of this invention is to provide a one-step process for the preparation of certain polyurethane-urea resins which may be practiced at room temperatures.

The objects of this invention are accomplished by a process for forming a homogeneous polyurethane-urea reaction product comprising contacting substantially simultaneously:

(a) A polyol having a hydroxy functionality substantially equal to or greater than 2 and 40 to 100 percent primary hydroxy terminal groups;

(b) An aromatic diamine having a reactivity substantially equal to or less than the reactivity of methylene bis(o-chloroaniline) towards toluene diisocyanate; and (c) An organic polyisocyanate in the presence of a catalyst which is a tetrasubstituted guanidine derivative of the following general formula or an adduct of said derivative and an organic isocyanate having a functionality between 1 and 3:

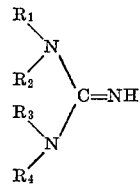

wherein $R_1$, $R_2$, $R_3$, and $R_4$ are the same or different and are phenyl groups or alkyl groups having between 1 and 6 carbon atoms inclusive.

The term polyol in this application includes compositions having active hydrogens attached to oxygen resulting in a hydroxy functionality substantially equal to or greater than 2. Active hydrogen atoms refers to hydrogens which, because of their position in the molecule, displace activity according to the Zerewitinoff test as described by Kohler in J. Am. Chem. Soc., 49, 3181 (1927). It is preferred that the hydroxy groups of the polyol be primary because of their greater reactivity, however, up to 60 percent of the hydroxy groups may be secondary. Preferably the polyol is a polyhydric alcohol, a polyalkylene ether or a polyester polyol or a mixture of the foregoing. As above stated, the polyol must have a hydroxy functionality substantially equal to or greater than 2. By substantially equal to 2 we mean that the functionality may be as low as about 1.8. As known in the art, a small amount of monohydric alcohol such as butanol may be admixed with the polyol to decrease the average hydroxy functionality of the polyol. Naturally, the selection of the polyol components will effect the physical and chemical properties of the product polyurethane-urea resin.

Examples of suitable polyhydric alcohols include polyvinyl alcohol; ethylene glycol; propylene glycol; 1,4-butanediol; 3-methylene-1,5 - pentanediol; 1,10 - decanediol; 1,1,1-tris[2 - hydroxyethoxymethyl]ethane; 2,2′ - isopropylidene-bis(p - phenyleneoxy)diethanol; trimethylolpropane; glycerol; hexanetriol; pentaerythritol; sorbitol; sucrose; dimethylolphenol; tetra(2-hydroxypropyl)ethylenediamine; and triethanolamine.

The polyalkylene ether polyols are preferably of the formula $HO[C_nH_{2n}O]_mH$ wherein $n$ is between 2 and 8 inclusive and $m$ is an integer such that the average molecular weight of the polyalkylene ether polyols is between 300 and 5000. Representative examples of suitable polyalkylene ether polyols useful in this invention are polyethylene ether glycol, polypropylene ether glycol, polytetramethylene ether glycol and mixtures of these glycols as well as copolymers thereof. Included with the above polyalkylene ethers are mixtures of polypropylene ether glycol and polytetramethylene ether glycol wherein the mixture comprises 40 or more percent primary hydroxyl. Also to be included with the examples of suitable polyalkylene ether polyols is polypropylene ether glycol wherein between 40 and 100 percent of the hydroxy terminal groups have been capped with ethylene oxide.

We have found it particularly advantageous in the preparation of clear polyurethane elastomers when a polyalkylene ether polyol is selected for the polyol to use polytetramethylene ether glycol, polypropylene ether glycol, polypropylene ether glycol capped with ethylene oxide, or mixtures thereof with the proviso that the above polyols have between 40 and 100 percent primary hydroxy terminal groups and have an average molecular weight between about 500 and about 300.

The polyester polyols useful in this invention include lactone polyesters such as polycaprolactone and polyesters prepared by the esterification reaction of a dibasic acid or an anhydride thereof with a glycol. Suitable dibasic acids include for example adipic, succinic, pimelic, suberic, azelaic, sebacic, terephthalic and the like, as well as mixtures thereof. Suitable glycols include for example lower molecular weight glycols having between 2 and 10 carbon atoms such as ethylene glycol, diethylene glycol, propanediols, butanediols, 1,6-hexamethylenediol, 1,8-octamethylenediol, trimethylol ethane, trimethylolpropane, 1,4-dimethylolcyclohexane, pentaerythritol, and the like, as well as mixtures thereof. Particularly satisfactory polyesters include for example polyethyleneadipate, polybutyleneadipate, and polyhexyleneadipate.

When a polyester is chosen as the polyol and a clear polyurethane-urea elastomer is desired, we prefer to use polycaprolactone, polyethyleneadipate, polybutyleneadipate, or a copolymer of ethyleneadipate and propyleneadipate and having a molecular weight between about 500 and about 3000 and between 40 and 100 percent primary hydroxy terminal groups.

In most instances it is desirable that the polyesters be of low acid number. The polyester molecule should have a functionality of two or more per average molecule. It is to be understood that polyesters having a functionality greater than two can be used but will tend to form inflexible non-elastomeric polyurethane-urea resins.

Polyhydric alcohols such as those described above may be admixed with the polyalkylene ethers or polyester polyols. For example we have found that if polytetramethylene ether glycol having an average molecular weight of 650 and 1,4-butanediol are blended to form a polyol admixture having an average molecular weight of about 200 that this polyol blend can be used in our process to give very fast, hot reactions which form clear, hard polyurethane-urea resins. To slow the reaction and soften the product, plasticizers can be incorporated into the formulation. We prefer that the admixture of polyhydric alcohols and polyalkylene ethers or polyester polyols have an average molecular weight between 200 and 3000.

The term "aromatic diamine" in this invention applies to amines wherein the amines are directly bonded to an aromatic group and have a reactivity substantially equal to or less than the reactivity of methylene bis(o-chloroaniline) towards toluene diisocyanate. Methylene dianiline and dimethylbenzidine for example are too reactive towards toluene diisocyanate to be useful in our invention. Representative satisfactory diamines are of the general formula:

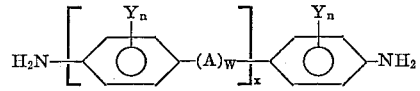

wherein Y is an electron withdrawing group which is nonreactive with isocyanates such as chlorine, bromine, iodine, nitro, and the like; $n$ is an integer between 1 and 4, inclusive; W is 0 or 1; X is 0 or 1, and A is oxide, sulfide, disulfide, sulfoxide, sulfone or an alkylene radical having between 1 and 6 carbon atoms. When A is an alkylene radical which contains at least 2 carbon atoms, the radical may be straight or branched chain. All are prepared by known procedures. Suitable diamines of the above formula include for example the following:

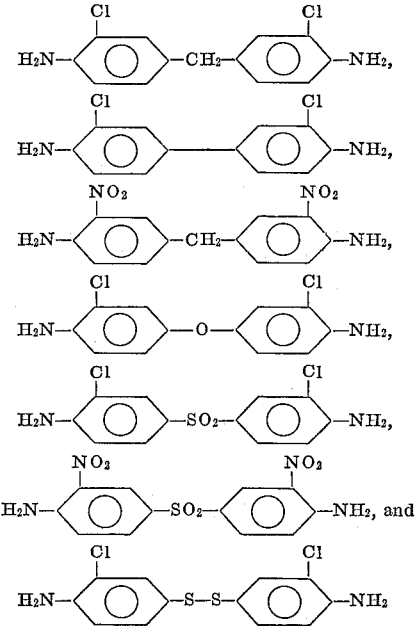

In the preparation of clear polyurethane-urea elastomers when the above mentioned polyols are selected, we prefer to use an aromatic diamine which is in a molar ratio to said polyol between about 0.05:1 and about 2.2:1.

The term "polyisocyanate" as used herein includes both aliphatic and aromatic polyisocyanates. The polyisocyanate used in this invention should contain greater than 1.5 isocyanate groups per molecule. This value manifestly constitutes an average value. Doubtless, some molecules may contain only one isocyanate group, while others may contain 4 or 6. The average, in most instances should fall within the range of about 1.8 to about 2.4. The polyisocyanates may contain a number of preformed urethane linkages. By polyisocyanate we therefore intend to include so called isocyanate prepolymers which are formed by the well known process of reacting a polyol with a part of the isocyanate. Suitable polyols include all those described above as well as lower molecular weight polyols such as ethylene glycol, propylene glycol, tetramethylene glycol, hexylene glycol, trimethylolpropane, trimethylolethane and glycerin.

Representative aliphatic polyisocyanates include 1,4-tetramethylene diisocyanate,
1,6-hexamethylene diisocyanate,
2,2,4-trimethyl-1,6-hexamethylene diisocyanate,
m- and p-xylylene diisocyanate,
α,α,α,α-tetramethyl-p-xylylene diisocyanate,
3-isocyanatomethyl-3,5,5-trimethylcyclohexyl isocyanate,
phenylenebis(2-ethyl isocyanate),
4-methyl-1,3-cyclohexylene diisocyanate,
2-methyl-1,3-cyclohexylene diisocyanate,
4,4'-methylene-bis(cyclohexyl isocyanate).

Examples of suitable aromatic polyisocyanates are toluene diisocyanate, diphenyl methane diisocyanate, diphenyl diisocyanate, triphenyl diisocyanate, chlorophenyl-2,3-diisocyanate, p-phenylene diisocyanate, 3,3'-dimethyl-4,4'-biphenylene diisocyanate, and 3,3'-dimethoxy-4,4'-biphenyl-methane-4,4'-diisocyanate.

While polyisocyanates having an isocyanate functionality greater than 2 are useful in this invention, it is to be realized that the resultant polyurethane-urea resin is likely not to be elastomeric but likely to be boardy and almost unresponsive to milling and processing in a manner conventionally associated with elastomeric products. Suitable higher polyisocyanates for example include:

2,4-bis(4-isocyanatocyclohexylmethyl)cyclohexyl isocyanate,
polymethylene polyphenylisocyanate,
1,2,4-benzene triisocyanate, and
triphenylmethane triisocyanate.

The amount of polyisocyanate is dependent on the total amount of polyol and aromatic amine. It is preferred that the number of equivalents of isocyanate be essentially equal to the number of equivalents of the combination of polyol and aromatic diamine. By essentially equal, we mean that the polyisocyanate may be between about 90 and about 110 percent of the theoretical amount of the combination of polyol and aromatic diamine. When more than 110 percent of the theoretical amount of isocyanate is used, the resins produced tend to be more highly cross linked. As is well known in the art, much less than 90 percent of the theoretical amount of isocyanate may be used to produce a lower molecular weight resin which if desired may be further polymerized by reaction with isocyanate, peroxide, diepoxide, or by other means.

The alkyl groups in the tetraalkylguanidine catalyst of the above formula can be methyl, ethyl, propyl, butyl, pentyl or hexyl and where the alkyl group contains 3 or more carbon atoms may be straight or branched chain.

At least some of these tetraalkylguanidines are relatively inexpensive to obtain and for reasons of economics we prefer to use tetramethylguanidine. All are readily prepared by known procedures. They are of low volatility, have little or no odor, and are soluble in the polyol component of the reaction mixture and are therefore easily contacted with the reactants.

The adducts of the above mentioned tetraalkylguanidines may be formed by reaction with an isocyanate. Suitable isocyanates include all those polyisocyanates described above as well as isocyanates having an isocyanate functionality less than 1.5. A satisfactory isocyanate in addition to those aforementioned is phenylisocyanate.

The adduct is advantageously prepared by reacting molar amounts of isocyanate and tetraalkylguanidine at 0° C. in a solvent inert towards the reactants such as toluene. Since the reaction is exothermic, the reaction may become violent. The temperature of the reaction vessel can be brought back to about 0° C. by cooling in accordance with techniques known to the art, as for instance, quenching the reaction vessel in a salt-ice bath.

Conventional metallic organic catalysts such as calcium naphthenate, dibutyltin dilaurate, stannous octoate, cobalt naphthenate, and lead octoate may be used in combination with the tetraalkylguanidine or adduct thereof as catalyst. In some cases, however, the metallic organic salt will tend to impair the aging qualities of the finished polyurethane-urea resin. While the use of a metallic organic salt as a co-catalyst is not excluded, we have not found it to be particularly advantageous.

The amount of catalyst is not narrowly critical but must be an amount sufficient to bring the isocyanate-amine and isocyanate-hydroxyl reaction rates into kinetic balance. The amount of catalyst required increases as the molecular weight of the polyol increases, as the percentage of primary hydroxyl groups decreases, and as the amount of diamine as compared to polyol increases. On the other hand, the amount of catalyst decreases as the temperature at which the reactants are contacted increases. We have found that it is advantageous to have at least 0.1 part by weight of tetraalkylguanidine in the catalyst per 100 parts of polyurethane-urea resin product. Larger amounts of catalyst may be used, but no commensurate advantage is gained thereby. The optimum amount of catalyst can be easily determined by one skilled in the art.

In carrying out the process of our invention, the polyisocyanate, polyol, and aromatic diamine are contacted substantially simultaneously with one another in the presence of the catalyst. Since many of the aromatic diamines are solids at room temperature, we have found it convenient to first solubilize them in the polyol component of the reaction mixture. We first add the diamine to the polyol and heat for a sufficient time and at an effective temperature to cause the diamine to dissolve in the polyol. While the diamine may be dissolved in the polyol at room temperature, we prefer to heat the mixture to about 90° C. with agitation. We do not find it advantageous to heat the mixture to temperatures much above 100° C. since some of the diamines form substantial amounts of carcinogenic vapors at those temperatures. After the diamine is dissolved, the mixture is cooled to room temperature and degassed.

Since the presence of the catalyst is absolutely necessary to equalize the isocyanate-amine and isocyanate-hydroxyl reaction rates, it is convenient to dissolve the catalyst in the polyol and amine component before contacting this mixture with the polyisocyanate. This is facile since as described above the tetraalkylguanidine derivative or the adduct thereof dissolves in the polyol component of the reaction mixture.

The mixture of polyol, diamine, and catalyst is reasonably stable and may be stored until needed but when mixed with polyisocyanate promptly reacts to produce a polyurethane-urea resin. When a cured polyurethane-urea resin is to be produced, the mixture of polyol, diamine, and catalyst and the polyisocyanate are quickly agitated together at a temperature above which the mixture of polyol and diamine crystallizes and are then poured if desired into a mold.

When a clear polyurethane-urea elastomer is desired and the above mentioned polyalkylene ether polyols or polyester polyol and organic diamines are selected, we prefer to use toluene diisocyanate as the polyisocyanate. The polyisocyanate should be added in an essentially equal molar ratio to the combination of the diamine and the polyol and in the presence of at least 0.1 part by weight of tetramethylguanidine in a catalyst per 100 parts of polyurethane-urea elastomer, said catalyst being tetramethylguanidine or an adduct of tetramethylguanidine and phenyl isocyanate or toluene diisocyanate. The simultaneous contacting of the reactants in the presence of the catalyst is preferably at a temperature between the temperature at which the mixture of polyol and aromatic diamine crystallizes and about 100° C. in the case where the polyol is one of the preferred polyesters and about 120° C. in the case where polyol is selected from the preferred polyalkylene ether glycols.

Curing may be effective without the application of external heat. However, if very fast curing is desired, the bodies may be heated, for example, in an oven at a temperature up to about 250° F. or 300° F. until full cure is attained. Usually this will take place within about 10 minutes to 2 hours. We have found that the physical properties of the resin may in some instances be optimized by heat aging the cured resin at a temperature between about 80° C. and 130° C. for several days.

The polyurethane-urea resins prepared by the process of our invention can be cast into films or coated onto solid surfaces. When the resin is an elastomer, the material can be used for casting wheels, tires, rollers, coating fabrics and the like.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

Throughout this application, it is to be understood that room temperature means about 25–27° C. It is further to be understood that the tensile strength and elasticity were determined by ASTM D412, the split tear strength by ASTM D470, and the Die C tear strength by ASTM D624. In the following examples parts and percentages are by weight unless otherwise indicated.

Example 1

In this example, the catalytic effects of tetramethylguanidine and several well known metallic organic catalysts or amine catalysts were compared in a typical polyurethane-urea elastomer formulation.

A series of samples were prepared, each sample comprised a mixture of 335.4 parts of polytetramethylene ether glycol having an average molecular weight of 900 and 32.6 parts of methylene bis (o-chloroaniline). The mixture was heated with agitation under a reduced pressure of 5 mm. of Hg at 90° C. for 1 hour. The resulting solution was then cooled to room temperature. To this solution in each sample was added the amount of catalyst indicated in Table I below. After the catalyst was added to the glycol and diamine mixture, the catalyzed mixture was degassed under a reduced pressure of 5 mm. of Hg. When no further gas would come out of the mixture, 90 parts of toluene diisocyante (80 percent of the 2,4-isomer and 20 percent of the 2,6-isomer) was blended into the mixture and the mixture was observed. The physical appearance of resins formed is indicated in the following table.

TABLE I

| Sample No. | Catalyst | Parts catalyst | Physical properties of resin formed |
|---|---|---|---|
| 1 | Tetramethylguanidine | 0.5 | Clear elastomer. |
| 2 | Lead octoate having a Pb content of 24% | 0.5 | Paste. |
| 3 | do | 2.0 | Do. |
| 4 | Mixture of organo-lead compounds having a Pb content of 36% | 2.0 | Do. |
| 5 | Mixture of organo-cobalt compounds having a Co content of 12% | 0.5 | Do. |
| 6 | Managanese naphthenate having a Mn content of 6% | 1.0 | Do. |
| 7 | Mixture of organo-zinc compounds and having a Zn content of 16% | 0.5 | Do. |
| 8 | Mixture of organo-calcium compounds and having a Ca content of 6% | 1.0 | Do. |
| 9 | Stannous octoate | 0.5 | Do. |
| 10 | do | 2.0 | Bubbled and streaked elastomer. |
| 11 | Dibutyltindilaurate | 0.5 | Do. |
| 12 | Triethylenediamine | 1.0 | Paste. |
| 13 | 2,4,6-tri(dimethylaminomethyl) phenol | 1.0 | Do. |
| 14 | Dimethyl cyclohexylamine | 1.0 | Do. |

In these samples, only tetramethylguanidine as catalyst produced an elastomer free of undesirable streaks and bubbles. Only sample 1 is an embodiment of this invention and samples 2 through 14 inclusive were prepared to be compared with the elastomer prepared in sample 1.

Example 2

The series of samples prepared in this example illustrates that the catalytic effect of various isocyanate adducts of tetramethylguanidine is similar to that of tetramethylguanidine.

The catalyst in each sample was prepared by contacting at 0° C. and in toluene the isocyanate and tetramethylguanidine in the ratio indicated in the table below.

The catalyst in the sample was then added to a mixture of 263 parts of polytetramethylene ether glycol having a molecular weight of 1000 and 67 parts of methylene bis(o-chloroaniline). The diamine had been solubilized in the glycol as described in Example 1. The resulting mixture containing catalyst was degassed under a reduced pressure of 5 mm. of Hg. When no further gas would come out of the mixture, 90 parts of toluene diisocyanate (80/20TDI) was blended into the mixture. The catalyzed resin mixture was immediately poured into heated molds which were maintained at 100° C. The cured resin was demolded in 1 hour, post cured for 16 hours at 100° C., and stored for 5 days at ambient temperatures before testing. The properties of the various clear, streak-free, and bubble-free elastomers are reported in Table II. All of the samples in the following table are embodiments of our invention.

TABLE II

| Sample No. | Catalyst | Parts catalyst | Hardness Shore | | Tensile strength (p.s.i.) | Elongation (percent) | Elasticity, p.s.i. | | Tear strength | |
|---|---|---|---|---|---|---|---|---|---|---|
| | | | A | D | | | 100 M | 300 M | Die C | Split |
| 15 | TDI:2 TMG | 0.7 | 93 | 41 | 4,500 | 455 | 800 | 1,750 | 315 | 135 |
| 16 | φNCO:TMG | 0.8 | 92 | 40 | 5,000 | 450 | 850 | 1,875 | 310 | 145 |
| 17 | ClφNCO:TMG | 1.2 | 92 | 40 | 4,900 | 475 | 850 | 1,875 | 330 | 155 |

Note.—TDI=Toluene diisocyanate; TMG=Tetramethylguanidine; φNCO=Phenyl isocyanate; ClφNCO=p-Chlorophenyl isocyanate.

Example 3

In this example a number of polyurethane-urea elastomers were prepared by using a variety of tetramethylguanidine and metallic organic catalyst mixtures as catalysts. These samples are compared to an elastomer wherein the catalyst is tetramethylguanidine alone. All of the below samples except sample 19 are embodiments of the present invention.

348 parts of polytetramethylene ether glycol having a molecular weight of 1000 and 44 parts of methylene bis- (o-chloroaniline) were mixed together. The diamine was dissolved in the glycol as described in Example 1. The catalyst indicated in Table III was added and the mixture was degassed under a reduced pressure of 5 mm. of Hg., 90 parts of toluene diisocyanate (80/TDI) was then blended into the degassed mixture. The catalyzed resin mixture was then molded, cured, and post-cured as described in Example 2. All of the samples except sample 19 were free of bubbles and streaks.

ether glycol, a clear elastomer having the properties indicated below was prepared. This embodiment of our invention comprised 320 parts of hydroxy terminated polycaprolactone having an average molecular weight of about 1240, 80 parts of methylene bis(o-chloroaniline), 0.6 part of tetramethylguanidine, and 90 parts of 80 percent 2,4-toluene diisocyanate and 20 percent of 2,6-toluene diisocyanate.

The elastomer had the following properties: Hardness,

TABLE III

| Sample No. | Catalyst | Parts catalyst | Hardness Shore A | Hardness Shore D | Tensile strength (p.s.i.) | Elongation (percent) | Elasticity, (p.s.i.) 100 M | Elasticity, (p.s.i.) 300 M | Tear strength Die C | Tear strength Split |
|---|---|---|---|---|---|---|---|---|---|---|
| 18 | Tetramethylguanidine | 0.4 | 73 | 22 | 4,600 | 550 | 400 | 700 | 250 | 100 |
| 19 | Dibutyltindilaurate | 0.4 | 90 | 36 | 3,680 | 600 | 800 | 1,400 | 334 | 75 |
| 20 | Tetramethylguanidine | 0.3 | 77 | 24 | 4,670 | 450 | 450 | 1,060 | 225 | 30 |
|  | Dibutyltindilaurate | 0.2 | 77 | 24 | 4,670 | 450 | 450 | 1,060 | 225 | 30 |
| 21 | Tetramethylguanidine | 0.3 | 74 | 20 | 4,100 | 520 | 400 | 770 | 242 | 50 |
|  | Stannous octoate | 0.2 | 74 | 20 | 4,100 | 520 | 400 | 770 | 242 | 50 |

Example 4

This example illustrates that both aliphatic and aromatic polyisocyanates may be used in the process of our invention.

A series of samples were prepared, each sample comprised 263 parts of polytetramethylene ether glycol having an average molecular weight of 1000, 67 parts of methylene bis(o-chloroaniline), 0.6 part of tetramethylguanidine and the polyisocyanate indicated in the table below. The elastomers were prepared in the same manner as in described in Example 2. The physical properties of the clear, bubble-free, and streak-free elastomers are reported in Table IV. All of the sample prepared for this example are embodiments of this invention.

Shore A, 83 and Shore D, 26; tensile strength, 5200 p.s.i.; elongation, 700%; elasticity, $M_{100}$, 435 p.s.i. and $M_{300}$, 750 p.s.i.; and tear strength, Die C, 200 p.s.i. and split, 265 p.s.i.

Example 7

In this example dichlorobenzidine was selected as the aromatic diamine.

Following the procedure of Example 2 except that dichlorobenzidine was substituted for the methylene bis(o-chloroaniline), a clear elastomer was prepared having the physical properties given below. This embodiment of our invention comprised 264 parts of polytetramethylene ether glycol having a molecular weight of 1000, 61 parts of dichlorobenzidine, 0.6 part of tetramethylguanidine,

TABLE IV

| Sample No. | Polyisocyanate | Hardness Shore A | Hardness Shore D | Tensile strength (p.s.i.) | Elongation (percent) | Elasticity, (p.s.i.) 100 M | Elasticity, (p.s.i.) 300 M | Tear strength Die C | Tear strength Split |
|---|---|---|---|---|---|---|---|---|---|
| 22 | 80/20 TDI | 91 | 43 | 5,600 | 380 | 1,000 | 3,000 | 300 | 150 |
| 23 | 100 TDI | 89 | 44 | 5,650 | 390 | 850 | 2,550 | 295 | 110 |
| 24 | MDI | (¹) | (¹) | (¹) | (¹) | (¹) | (¹) | (¹) | (¹) |
| 25 | H₁₂MDI | (¹) | (¹) | (¹) | (¹) | (¹) | (¹) | (¹) | (¹) |

¹ Clear elastomer.

NOTE.—80/20 TDI=80% 2,4-isomer and 20% 2,6-isomer of toluene diisocyanate; MDI=Methylene bis (4-phenyl isocyanate); H₁₂MDI=4, 4'-methylene-bis (cyclohexyl isocyanate).

Example 5

One of the purposes of the example is to demonstrate that as the amount of 2,4-isomer of toluene diisocyanate increases, the amount of tetramethylguanidine necessary to produce a clear elastomer is decreased.

Two samples were prepared, each sample comprised 348 parts of polytetramethylene ether glycol having an average molecular weight of 1000, and 44 parts of methylene bis(o-chloroaniline). The samples further comprised 90 parts of the polyisocyanate and the amount of tetramethylguanidine indicated in Table V. The elastomers were prepared in the same manner as is described in Example 2. The properties of the elastomers are reported in the following table. Both of the samples illustrate our invention.

and 90 parts of 80% 2,4-toluene diisocyanate and 20% 2,6-toluene diisocyanate. The elastomer had a hardness, Shore A, 91 and Shore D, 48; tensile strength, 4845 p.s.i.; elongation, 410%; elasticity, $M_{100}$, 1500 p.s.i. and $M_{300}$, 3100 p.s.i.; and tear strength, Die C, 425 p.s.i. and split 265 p.s.i.

Example 8

In Sample 28, 0.6 part of tetramethylguanidine was added to a mixture of 305 parts of polytetramethylene ether glycol having an average molecular weight of 1000, 5 parts of triethanolamine, and 52 parts of methylene bis-(o-chloroaniline). The diamine had been solubilized in the glycol as described in Example 1. The resulting mixture containing catalyst was degassed as in Example 2. 98 parts of toluene diisocyanate (80/20TDI) was blended

TABLE V

| Sample No. | Polyisocyanate | Parts catalyst | Hardness Shore A | Hardness Shore D | Tensile strength (p.s.i.) | Elongation (percent) | Elasticity, (p.s.i.) 100 M | Elasticity, (p.s.i.) 300 M | Tear strength Die C | Tear strength Split |
|---|---|---|---|---|---|---|---|---|---|---|
| 26 | 80/20 TDI | 0.5 | 73 | 22 | 4,600 | 550 | 400 | 700 | 250 | 100 |
| 27 | 65/35 TDI | 0.6 | 74 | 21 | 4,600 | 510 | 400 | 810 | 240 | 50 |

NOTE.—80/20 TDI=80% 2,4-isomer and 20% 2,6-isomer of toluene diisocyanate; 65/35 TDI=2,4-isomer and 35% 2,6-isomer of toluene diisocyanate.

Example 6

In this example, a polyester was used as the polyol. Following the procedure of Example 2 except that polycaprolactone was substituted for the polytetramethylene into the mixture. The catalyzed resin mixture was immediately poured into heated molds which were maintained at 100° C. The cured resin was demolded in 1 hour, post cured for 16 hours at 100° C., and stored for 5 days at ambient temperatures before testing. The properties of the bubble-free elastomers are reported in Table VI below.

Sample 29 was prepared in the same manner as Sample 28 except that 10 parts by triethanolamine and 108 parts of toluene diisocyanate (80/20TDI) were used in this sample. The properties of this bubble-free elastomer are also given in Table VI.

TABLE VI

| Sample No. | Hardness Shore A | Tensile strength (p.s.i.) | Elongation (percent) | Elasticity, (p.s.i.) 100 M | 300 M | Tear strength Die C | Split |
|---|---|---|---|---|---|---|---|
| 28 | 75 | 4,250 | 410 | 470 | 1,270 | 200 | 40 |
| 29 | 73 | 3,500 | 350 | 500 | 1,800 | 160 | 35 |

The above examples clearly demonstrate the accomplishments of this invention. Example 1 demonstrates the superiority of the catalysts used in our process over the catalysts used in the prior art in similar one-step processes for the preparation of polyurethane-ureas. Example 2 illustrates that adducts of tetraalkylguanidines and isocyanates are effective as catalysts in our processes, and Example 3 demonstrates that mixtures of tetraalkylguanidine derivatives and conventional organic metallic catalysts are effective catalysts.

Examples 4 through 8 inclusive demonstrate that a variety of polyols, aromatic diamines, and polyisocyanates as described above may be used in our process.

From the foregoing description we consider it to be clear that the present invention contributes a substantial benefit to the polymer art by providing a one-step process for the preparation of certain polyurethane-urea resins.

We claim:

1. A process for forming a homogeneous polyurethane-urea reaction product comprising reacting substantially simultaneously:
   (a) a polyol having a hydroxy functionality substantially equal to or greater than 2 and 40 to 100 percent primary hydroxy terminal groups;
   (b) an aromatic diamine having a reactivity substantially equal to or less than the reactivity of methylene bis(o - chloroaniline) towards toluene diisocyanate, said diamine being in a molar ratio to said polyol between about 0.05:1 and about 2.2:1, and
   (c) an organic polyisocyanate in the presence of a catalyst which is a tetrasubstituted guanidine derivative of the following general formula or an adduct of said derivative and an organic isocyanate having a functionality between 1 and 3:

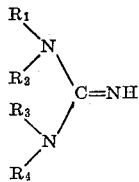

wherein $R_1$, $R_2$, $R_3$ and $R_4$ are the same or different and are alkyl groups having between 1 and 6 carbon atoms inclusive.

2. The process as in claim 1 wherein the aromatic diamine further is of the general formula:

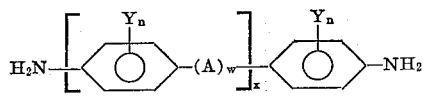

where Y is an electron withdrawing group and nonreactive with an isocyanate group; $n$ is an integer between 1 and 4, inclusive; W is 0 or 1; X is 0 or 1; and A is oxide, sulfide, disulfide, sulfoxide, sulfone, or an alkylene radical having between 1 and 6 carbon atoms inclusive.

3. The process as in claim 1 wherein the polyol is polytetramethylene ether glycol.

4. The process as in claim 1 wherein the polyol is polypropylene ether glycol of which between 40 and 100 percent, inclusive, has been capped with ethylene oxide.

5. The process as in claim 1 wherein the polyol is a mixture of polytetramethylene ether glycol and polypropylene ether glycol.

6. The process as in claim 1 wherein the polyol is a polyester.

7. The process as in claim 6 wherein the polyester is polycaprolactone, polyethyleneadipate, polybutyleneadipate, or a copolymer of ethyleneadipate and propyleneadipate.

8. The process as in claim 1 wherein the aromatic diamine is methylene bis(o-chloroaniline) or dichlorobenzidine.

9. The process as in claim 1 wherein the organic polyisocyanate is toluene diisocyanate.

10. The process as in claim 1 wherein the guanidine derivative is tetramethylguanidine.

11. The process as in claim 1 wherein the catalyst is an adduct of tetramethylguanidine and phenyl isocyanate or toluene diisocyanate.

12. The process as in claim 1 wherein said reacting is at a temperature between the temperature at which the mixture of polyol and aromatic diamine crystallizes and about 120° C.

13. A process of forming a clear polyurethaneurea elastomer comprising reacting substantially simultaneously:
   (a) a polyol which is polytetramethylene ether glycol, polypropylene ether glycol, polypropylene ether glycol capped with ethylene oxide, or mixtures thereof; said polyol having between 40 and 100 percent primary hydroxy terminal groups and having an average molecular weight between about 500 and about 3000;
   (b) an aromatic diamine which is methylene bis(o-chloroaniline) or dichlorobenzidine, said diamine being in a molar ratio to said polyol between about 0.05:1 and about 2.2:1; and
   (c) an organic polyisocyanate which is toluene diisocyanate, said diisocyanate being in an essentially equal molar ratio to the combination of said diamine and said polyol; in the presence of at least 0.1 part by weight of tetramethylguanidine in a catalyst per 100 parts of polyurethane-urea elastomer, said catalyst being tetramethylguanidine or an adduct of tetramethylguanidine and phenyl isocyanate or toluene diisocyanate; said reacting being at a temperature between the temperature at which the mixture of polyol and aromatic diamine crystallizers and about 120° C.

14. A process of forming a clear polyurethane-urea elastomer comprising reacting substantially simultaneously:
   (a) a polyol which is polycaprolactone, polyethyleneadipate, polybutyleneadipate, or a copolymer of ethyleneadipate and propyleneadipate having a molecular weight between about 500 and about 3000 and having between 40 and 100 percent primary hydroxy terminal groups;
   (b) an aromatic diamine which is methylene bis(o-cloroaniline) or dichlorobenzidine, said diamine being in a molar ratio to said polyol between about 0.05:1 and about 2.2:1; and
   (c) an organic polyisocyanate which is toluene diisocyanate, said diisocyanate being in an essentially equal molar ratio to the combination of said diamine and said polyol; in the presence of at least 0.1 parts by weight of tetramethylguanidine in a catalyst per 100 parts of polyurethane-urea elastomer, said catalyst being tetramethylguanidine or an adduct of tetramethylguanidine and phenyl isocyanate or toluene diisocyanate; said reacting being at a temperature between the temperature at which the mixture of polyol and aromatic diamine crystallizes and about 100°C.

References Cited

UNITED STATES PATENTS

| | | | |
|---|---|---|---|
| 3,238,154 | 3/1966 | Mosso | 260—2.5 |
| 3,632,845 | 1/1972 | Brownsword | 260—75 NH |
| 3,635,851 | 1/1972 | Hoeschele | 260—2.5 AM |
| 2,929,800 | 3/1960 | Hill | 260—77.5 AM |
| 3,645,924 | 2/1972 | Fogiel | 260—2.5 AC |

OTHER REFERENCES

Defensive Publication T-858,002 (Appl. S.N. 720,492 of Fogiel) Jan. 29, 1969, 1 page.

M. J. WELSH, Primary Examiner

H. S. COCKERAM, Assistant Examiner

U.S. Cl. X.R.

260—77.5 AC, 77.5 AM, 77.5 AN